Aug. 6, 1940.  W. D. JEWELL  2,210,121
POWER TRANSMISSION
Filed Jan. 23, 1937  2 Sheets-Sheet 1

INVENTOR
WENDELL D. JEWELL
BY
ATTORNEY

Aug. 6, 1940.        W. D. JEWELL        2,210,121
POWER TRANSMISSION
Filed Jan. 23, 1937        2 Sheets-Sheet 2

INVENTOR
WENDELL D. JEWELL
BY
ATTORNEY

Patented Aug. 6, 1940

2,210,121

UNITED STATES PATENT OFFICE 2,210,121

POWER TRANSMISSION

Wendell D. Jewell, Wilkes-Barre, Pa., assignor to The Waterbury Tool Company, Waterbury, Conn., a corporation of Connecticut Application January 23, 1937, Serial No. 122,037

6 Claims. (Cl. 60—53)

This invention relates to power transmissions and more particularly to those of the type comprising two or more fluid pressure energy translating devices one of which may function as a pump and another as a fluid motor. Transmissions of this character while providing an infinite number of speed ratios between the driving and driven ends, that is while they provide an absolutely stepless change in speed ratio, do not provide a completely positive drive through the transmission and are subject to small variations in speed ratio at any particular setting. These variations are caused by a number of factors, among them the oil temperature and viscosity, working pressure and normal wear. For most applications the effect of such variations is negligible. In other applications it is desirable to provide the greatest possible accuracy of ratio setting.

One situation where such a requirement is met is in the driving of the flying shear in a continuous strip rolling mill, where the speed ratio between the flying shear and the last finishing roll determines the distance between successive cuts by the shear. While hydraulic variable speed transmissions are successfully being used in this service today, the control of the speed ratio is accomplished by a trial and error method of hand adjustment each time the speed ratio setting is changed for cutting the strip to a different length. Likewise, it is necessary to constantly check this setting and correct for deviations from the desired length of finished stock as they occur.

It is an object of the present invention to provide a variable speed hydraulic transmission system wherein automatic means is provided for continuously measuring and correcting for any deviations from the desired speed ratio of the transmission.

A further object is to provide a transmission system of the character described wherein a pilot transmission has its input end connected to be driven at a controlled speed and its output end connected to the driven member of the main transmission and to provide means operated from the pilot transmission for controlling the speed ratio setting of the main transmission.

Further objects and advantages of the present invention will be apparent from the following description, reference being had to the accompanying drawings wherein a preferred form of the present invention is clearly shown.

Figure 1:
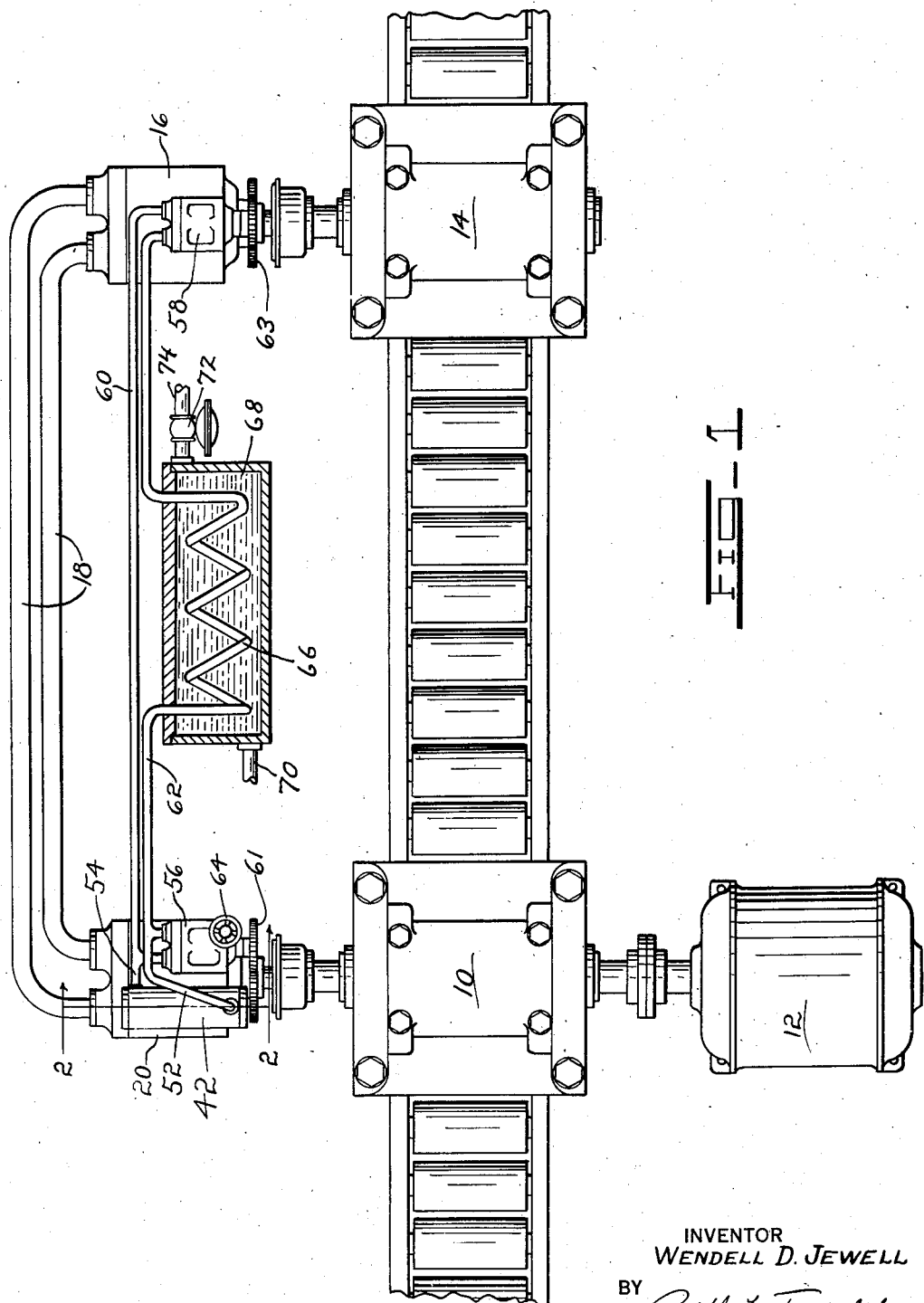
Fig. 1 is a plan view of a portion of a rolling mill incorporating a transmission system embodying a preferred form of the present invention.
Figure 2:
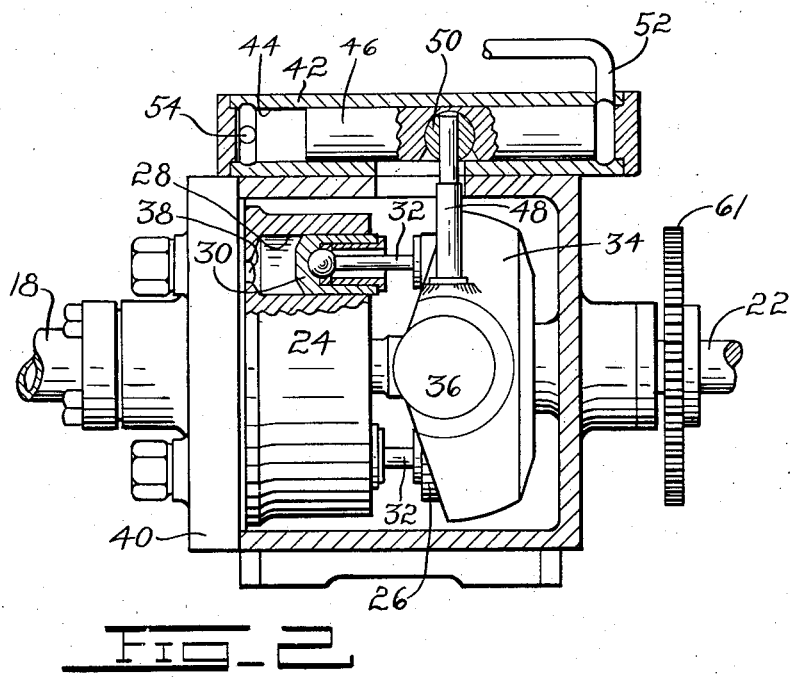
Fig. 2 is a cross section on line 2—2 of Fig. 1.

Referring now to Fig. 1 a roll stand 10 representing the last finishing roll of a continuous strip mill is driven by an electric motor 12 in the usual manner. In line with the roll stand 10 is a flying shear 14 which is driven by a fixed displacement fluid motor 16 forming part of a principal hydraulic variable speed transmission. The motor 16 is connected by supply and return conduits 18 to a variable displacement pump 20 which is driven from the roll stand 10. The motor 16 and pump 20 may be of any suitable construction, for example, the well-known "Waterbury" type, the internal construction of which is illustrated in Fig. 2.

The pump comprises a shaft 22 to which a cylinder barrel 24 and a socket ring 26 are connected for rotation therewith. The barrel 24 is provided with cylinders 28 within which pistons 30 are reciprocated by means of ball-ended connecting rods 32 connected to the socket ring 26. The latter is rotatably mounted in a tilting box 34, the inclination of which may be varied by tilting the same about horizontal trunnions 36. The cylinders 28 are provided with ports 38 cooperating with a pair of arcuate ports, not shown, formed in the valve plate 40 and communicating with the supply and return conduits 18. The position of the tilting box 34 may be controlled by a fluid motor 42 comprising a double ended cylinder 44 within which a piston 46 is freely slidable. The latter connects to a stud 48 on the tilting box 34 by a pivoting and sliding connection at 50. The internal construction of the motor 16 may be similar to that of the pump 20 except that a fixed angle box is provided in place of the adjustable tilting box.

The opposite ends of the cylinder 44 communicate by conduits 52 and 54 with a pilot transmission system comprising a variable displacement pump 56 and a fixed displacement pump 58. Conduits 60 and 62 connect the pumps 56 and 58 and the motor 42 in parallel. The pump 56 may be driven from any shaft which operates at a controlled speed and to which it is desired to correlate the rotation of the output shaft of the motor 16. Conveniently pump 56 may be driven from the shaft of the pump 20 by gearing 61. The pump 58 has its drive shaft connected by gearing 63 with the output shaft of the motor 16. The pumps 56 and 58 may be similar in construction to the pump 20 and motor 18 except that they may be of considerably smaller displacement. The pump 56 is provided with any suitable means for controlling its displacement, such as a handwheel 64.

In operation the roll stand 10 is driven by the motor 12 while the shear 14 is driven from the roll stand 10 through the transmission 16, 18 and 20. The pilot transmission 56, 58, 60 and 62 has its pumps 56 and 58 operated in synchronism with the pump 20 and motor 16 of the main transmission. As long as the shear operates at a speed such that the pump 58 displaces the same quantity of fluid which is displaced by the pump 56 at the particular setting of the handwheel 64, the pilot transmission operates without any load whatever, merely circulating fluid from the pump 56 through the conduit 62 to the pump 58 and back to the pump 56 through the conduit 60.

Should the shear tend to speed up, the pump 58 will displace a greater quantity of fluid than is displaced by the pump 56, the excess being absorbed by the motor 42; entering through the conduit 54 and discharging through the conduit 52. The tilting box 34 is thus moved clockwise in Fig. 2 tending to decrease the displacement of the pump 20 and thus slow down the shear to the desired speed for which the pump 56 is set. Should the shear speed decrease below the desired value the excess fluid is delivered by the pump 56 and absorbed by the motor 42 in the opposite direction, thus bringing the shear speed back to the desired value.

For the purpose of maintaining a high degree of accuracy in the pilot transmission, means may be provided for maintaining the working fluid at a constant temperature. Thus, a cooling coil 66 may form part of the conduit 62 and be immersed in a tank of water 68 supplied through a conduit 70. A thermostatic valve 72 controls the outlet 74 to maintain a constant temperature of the water leaving the tank.

It will be seen that the pilot transmission operates at a very low working pressure which is only that necessary to operate the displacement controlling motor 42. The variations in speed ratio occurring at the pilot transmission are thus made much smaller than the variations occurring in the main transmission so that a higher degree of accuracy in ratio control of the main transmission is thus accomplished. In addition the pilot transmission being small relative to the main transmission can be economically manufactured to a higher degree of accuracy than the large main transmission which transmits the full power requirements of the shear 14.

While the form of embodiment of the invention as herein disclosed, constitutes a preferred form, it is to be understood that other forms might be adopted, all coming within the scope of the claims which follow.

What is claimed is as follows:

1. In a variable speed power transmission system the combination of a variable displacement pump, a fluid motor, supply and return conduits connecting the pump and motor to form a hydraulic transmission, driving and driven elements connected to said pump and motor, a fluid motor for controlling the displacement of the pump, a pilot transmission comprising two pumps one of which is of the variable displacement type, means for operating one pilot pump to deliver fluid at a rate corresponding to the desired speed of the first fluid motor, means connecting the other pilot pump to operate in predetermined relation to the operation of the first fluid motor, and a fluid circuit connecting the pilot pumps and the displacement controlling fluid motor for operation of the latter in response to a departure of the first fluid motor from the speed at which one pilot pump displaces the same quantity of fluid that is displaced by the other pilot pump, whereby the speed of the first fluid motor is restored to said desired speed.

2. In a variable speed power transmission system the combination of a variable displacement pump, a fluid motor, supply and return conduits connecting the pump and motor to form a hydraulic transmission, driving and driven elements connected to said pump and motor, a fluid motor for controlling the displacement of the pump, a pilot transmission comprising two pumps one of which is of the variable displacement type, means for operating one pilot pump in predetermined relation to the operation of the first pump, means connecting the other pilot pump to operate in predetermined relation to the operation of the first fluid motor, and a fluid circuit connecting the pilot pumps and the displacement controlling fluid motor for operation of the latter in response to a departure of the first fluid motor from the speed at which one pilot pump displaces the same quantity of fluid that is displaced by the other pilot pump.

3. In a variable speed power transmission system the combination of a variable displacement pump, a fluid motor, supply and return conduits connecting the pump and motor to form a hydraulic transmission, driving and driven elements connected to said pump and motor, a fluid motor for controlling the displacement of the pump, a pilot transmission comprising two pumps one of which is of the variable displacement type, means for operating one pilot pump to deliver fluid at a rate corresponding to the desired speed of the first fluid motor, means connecting the other pilot pump to operate in predetermined relation to the operation of the first fluid motor, and a closed fluid circuit connecting the pilot pumps and the displacement controlling fluid motor in parallel, whereby the speed of the first fluid motor is restored to said desired speed.

4. In a drive for a sectional machine the combination of a main variable speed transmission having its input end operatively connected to one section of the machine and its output end connected to another section, a pilot variable speed hydraulic transmission having one end operated at a controlled speed and its other end connected to said other section, and means operated by the pilot transmission for controlling the speed ratio of the main transmission, the last means being hydraulically connected into the working circuit of the pilot transmission.

5. In a drive for a sectional machine the combination of a main variable speed transmission having its input end operatively connected to one section of the machine and its output end connected to another section, a pilot variable speed hydraulic transmission having one end connected to said one section and its other end connected to said other section, and means operated by the pilot transmission for controlling the speed ratio of the main transmission, the last means being hydraulically connected into the working circuit of the pilot transmission.

6. In a variable speed power transmission system the combination of a main variable speed transmission operatively connected between a driving and a driven element, a pilot variable speed hydraulic transmission having one end operated at a controlled speed and its other end connected to the driven element, and fluid motor means in circuit with the pilot transmission for controlling the speed ratio of the main transmission.

WENDELL D. JEWELL.